United States Patent [19]

Bowen

[11] Patent Number: 5,037,109
[45] Date of Patent: Aug. 6, 1991

[54] SPACE TRAVEL GAME

[76] Inventor: Christopher A. Bowen, 2509 Tennesse St., Vallejo, Calif. 94591

[21] Appl. No.: 622,545

[22] Filed: Dec. 5, 1990

[51] Int. Cl.⁵ .................................................. A63F 3/00
[52] U.S. Cl. ...................................... 273/253; 273/255
[58] Field of Search ................................ 273/248–255, 273/256, 271

[56] References Cited

U.S. PATENT DOCUMENTS

| | | | |
|---|---|---|---|
| 2,273,009 | 2/1942 | Fisher | 273/255 |
| 3,099,451 | 7/1963 | Newhouse | 273/253 |
| 3,223,420 | 12/1965 | Turner | 273/253 |
| 4,157,184 | 6/1979 | Recard | 273/253 |
| 4,570,939 | 2/1986 | Tourville | 273/253 |

FOREIGN PATENT DOCUMENTS 1015952  1/1966  United Kingdom ................ 273/253

Primary Examiner—Benjamin Layno
Attorney, Agent, or Firm—Leon Gilden

[57] ABSTRACT

A game is set forth wherein a game board includes a series of coaxially arranged paths, wherein the paths include orbital path of travel of planets and asteroids about a central solar space. The players of the game direct tokens through the various concentric paths to encounter the planets and thereby effect conquest of a planet. A player to encounter all of the planets is declared a winner. Various impediments and obstacles are provided in play of the game in conflict with opposing players and with paths of travel of various impediments, such as the asteroids.

2 Claims, 6 Drawing Sheets

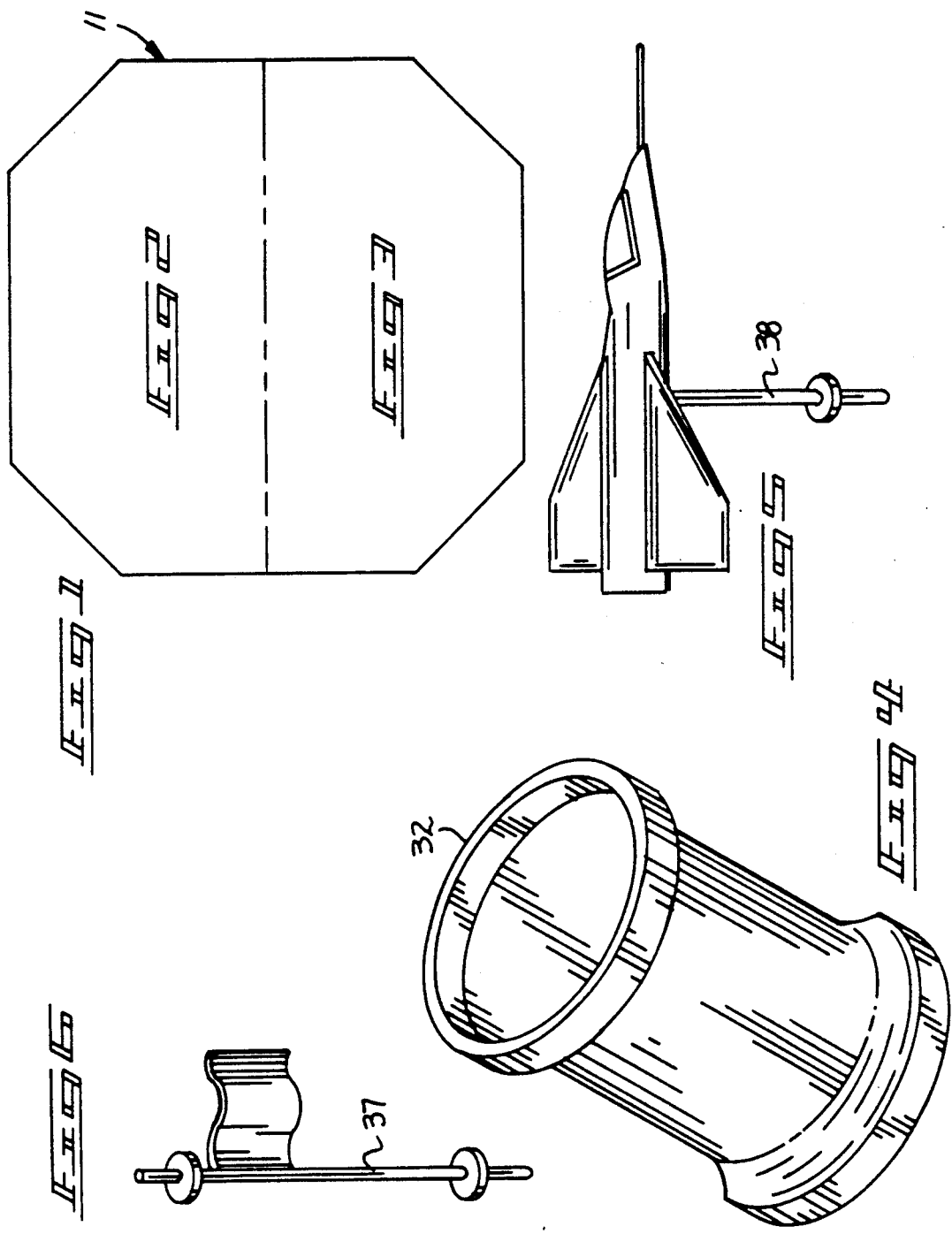

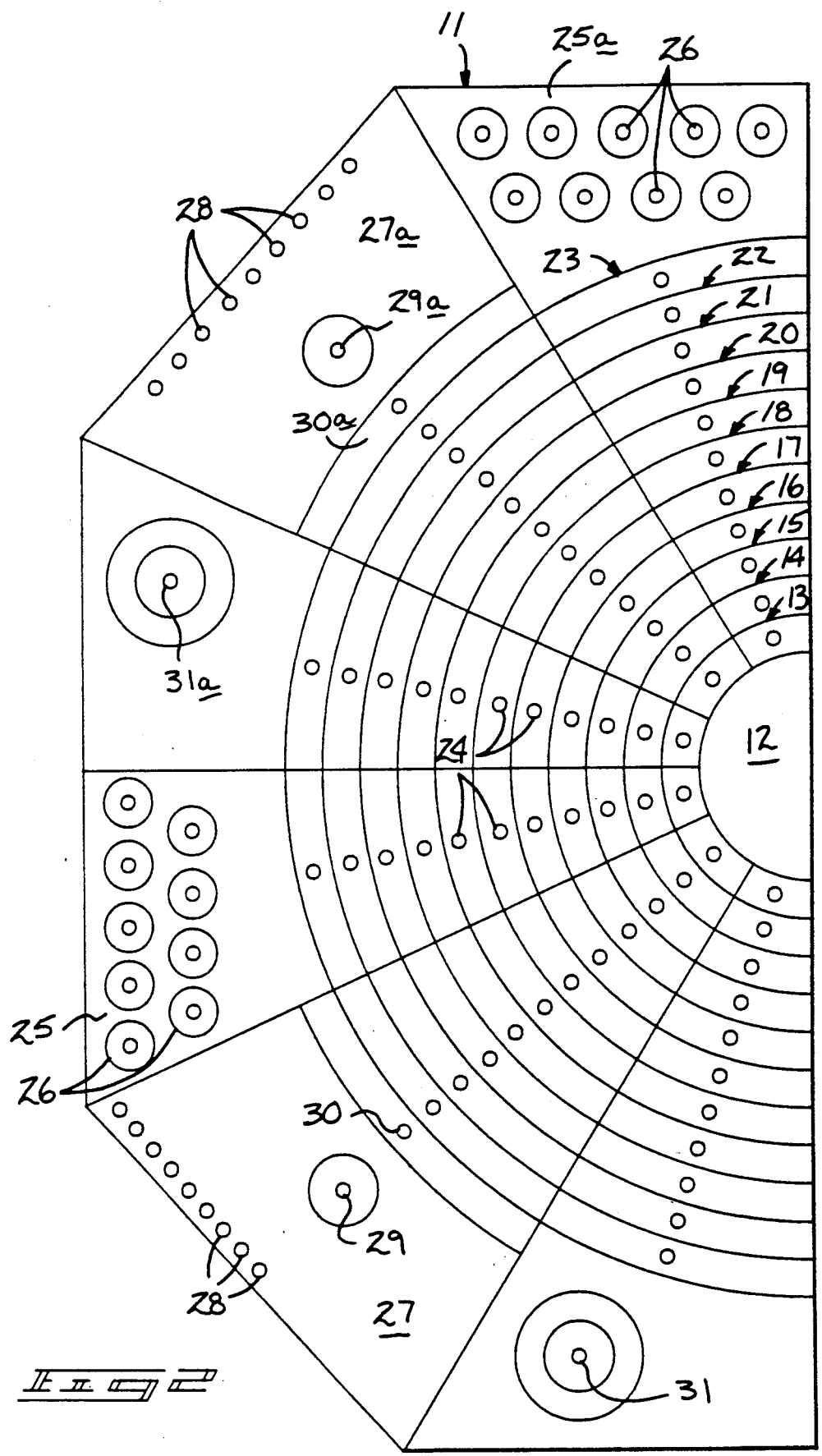

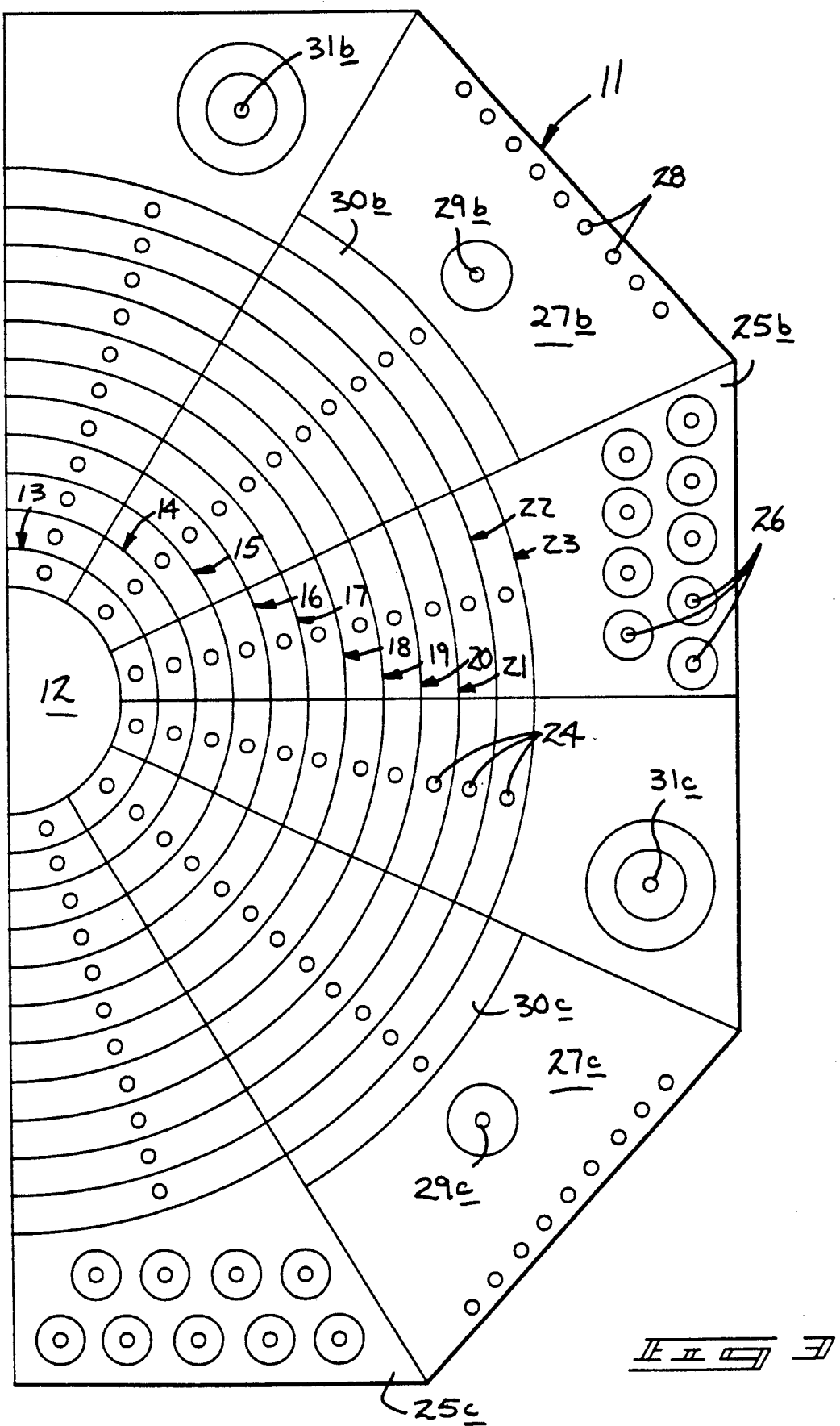

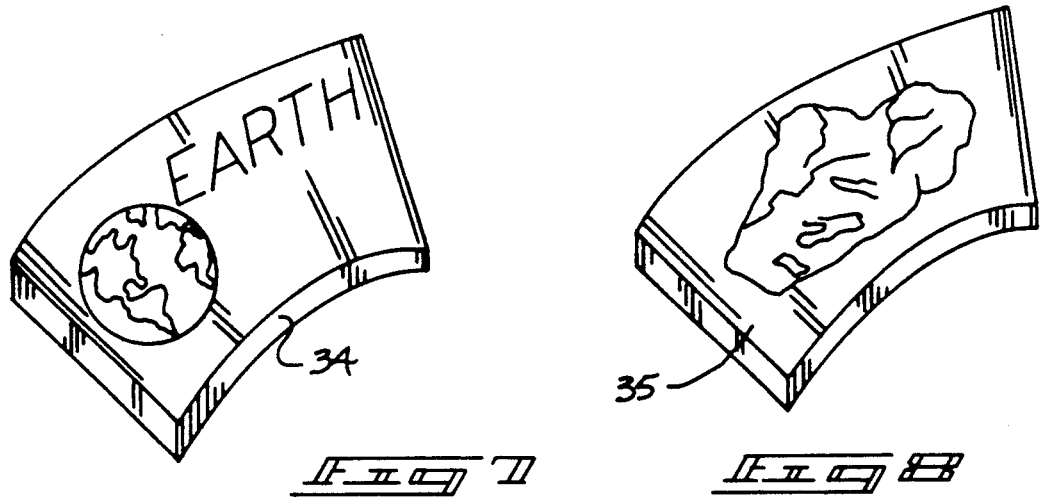
Fig 7  Fig 8
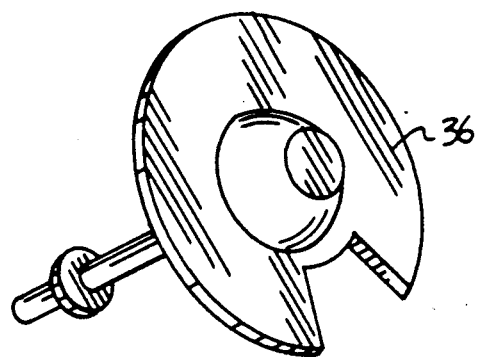
Fig 9
Fig 10
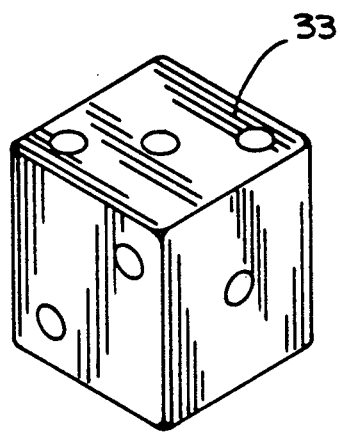

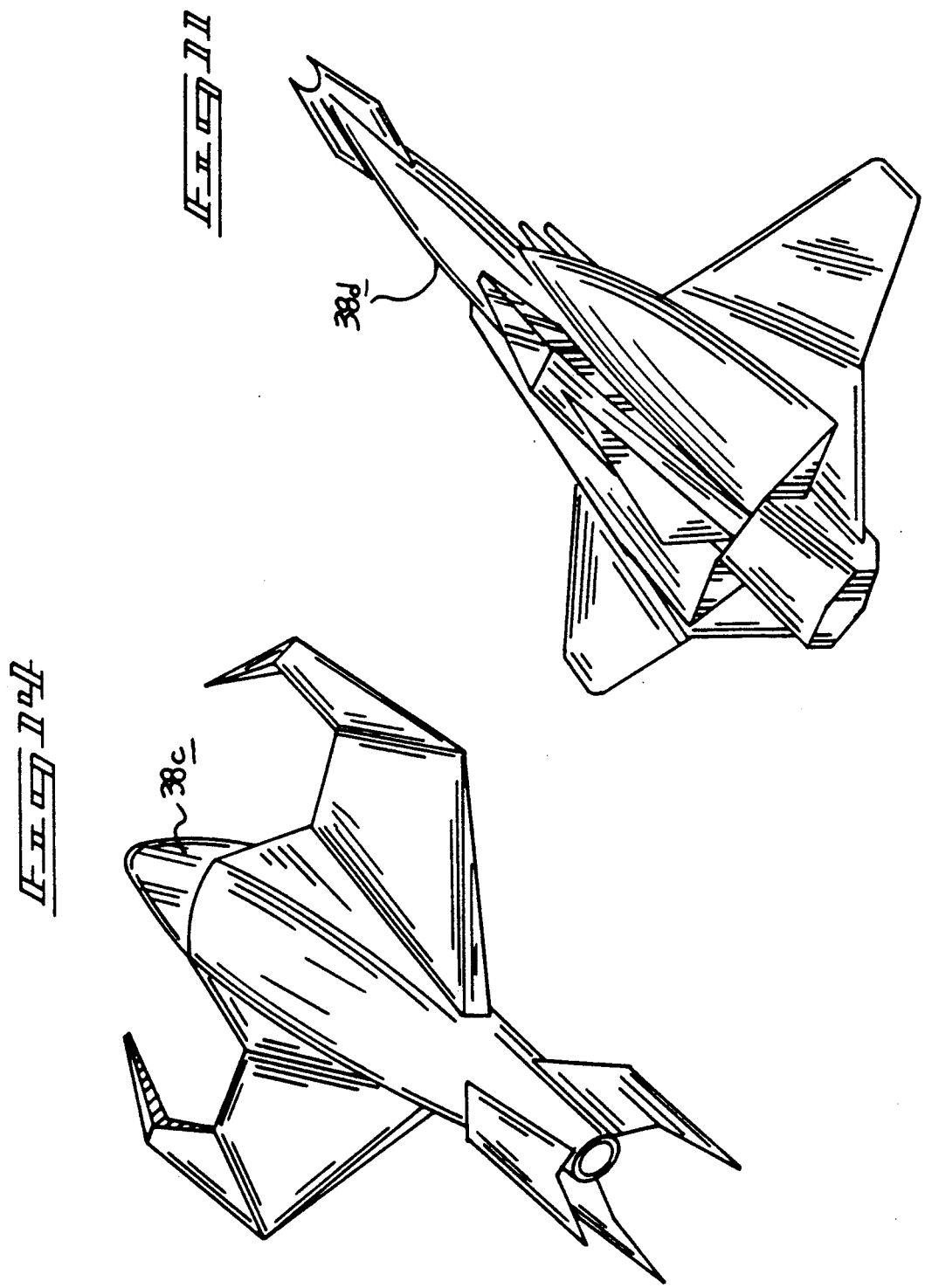

SPACE TRAVEL GAME

BACKGROUND OF THE INVENTION

1 Field of the Invention

The field of invention relates to space traveling games, and more particularly pertains to a new and improved space travel game wherein the same presents opposing players in an effort for a single player to develop conquests of the planetary system known as the solar system.

2. Description of the Prior Art

Various space shuttle games have been utilized in the prior art for entertainment and amusement of individuals. Heretofore, however, there has not been presented a space travel game to effectively simulate space travel while simultaneously avoiding hazards of asteroids while attempting to land on planets that are also in motion in concentric paths about a central space, as set forth by the instant invention. Examples of the prior art may be found in U.S. Pat. No. 4,804,190 to Hofmann setting forth a space-type game utilizing color matching and picture matching in movement of various players throughout the game.

U.S. Pat. No. 4,114,891 to Lawrimore sets forth a hazardous travel simulating game where interplanetary space travel is directed about a circuitous path around a periphery of a playing board, with various obstacles in the path of play encountered by a token directed into the path, as opposed to the instant invention wherein hazards are in motion, as well as the tokens in play of the game.

U.S Pat. No. 4,111,427 to Patterson sets forth a space travel game wherein a game board directs play and motion of players about the game board, with a spinner indicating number of blocks to be traveled, with various impediments encountered by a token in the path of travel.

U S. Pat. No. 4,504,061 to Michel sets forth a space travel game wherein a plurality of concentric orbits and wherein escape orbits are also provided but as in other type games, the objects of the game are stationary, as opposed to the instant invention wherein the objects of the game, i.e. the planets, are also in motion about a central solar space.

U.S Pat. No. 3,533,628 to Fisher sets forth a space travel game board organization wherein various stages are required in the traverse of the game board by players, as opposed to the instant invention wherein, as noted above, the object tokens of the game are in motion as well as the tokens by the players, with opposing players controlling motion of object tokens such as the planets to prevent access thereto by competitive players.

As such, it may be appreciated that there continues to be a need for a new and improved space travel game as set forth by the instant invention which addresses both the problems of ease of use as well as effectiveness in organization and construction and in this respect, the present invention substantially fulfills this need.

SUMMARY OF THE INVENTION

In view of the foregoing disadvantages inherent in the known types of space travel games now present in the prior art, the present invention provides a space travel game wherein the same directs various tokens through concentric orbits in an effort to gain access to orbiting planets in motion and controlled by players of the game. As such, the general purpose of the present invention, which will be described subsequently in greater detail, is to provide a new and improved space travel game which has all the advantages of the prior art space travel games and none of the disadvantages.

To attain this, the present invention provides a game wherein a game board includes a series of coaxially arranged paths, wherein the paths include orbital path of travel of planets and asteroids about a central solar space. The players of the game direct tokens through the various concentric paths to encounter the planets and thereby effect conquest of a planet. A player to encounter all of the planets is declared a winner. Various impediments and obstacles are provided in play of the game in conflict with opposing players and with paths of travel of various impediments, such as the asteroids.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved space travel game which has all the advantages of the prior art space travel games and none of the disadvantages.

It is another object of the present invention to provide a new and improved space travel game which may be easily and efficiently manufactured and marketed.

It is a further object of the present invention to provide a new and improved space travel game which is of a durable and reliable construction.

An even further object of the present invention is to provide a new and improved space travel game which is susceptible of a low cost of manufacture with regard to both materials and labor, and which accordingly is then susceptible of low prices of sale to the consuming public, thereby making such space travel games economically available to the buying public.

Still yet another object of the present invention is to provide a new and improved space travel game which provides in the apparatuses and methods of the prior art some of the advantages thereof, while simultaneously overcoming some of the disadvantages normally associated therewith.

Still another object of the present invention is to provide a new and improved space travel game wherein the same directs play of various players in concentric orbits to gain access and conquest of various tokens representative of planets of the solar system for education and amusement of the players.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top orthographic diagrammatic illustration of the game board of the instant invention.

FIG. 2 is a detailed orthographic view of "FIG. 2" as represented in FIG. 1.

FIG. 3 is a top orthographic detailed view of "FIG. 3" as represented in FIG. 1.

FIG. 4 is an isometric illustration of a dice cup as utilized by the instant invention.

FIG. 5 is an isometric illustration of a player token as utilized by the instant invention.

FIG. 6 is an isometric illustration representative of flag tokens utilized in play of the instant invention.

FIG. 7 is an isometric illustration of a representative planet token utilized by the instant invention.

FIG. 8 is an isometric illustration of a representative asteroid token utilized by the instant invention.

FIG. 9 is an isometric illustration of one of a plurality of missile indicator tokens utilized by the instant invention.

FIG. 10 is an isometric illustration of a typical die utilized by each player of the instant invention.

FIGS. 11, 12, 13, and 14 are isometric illustrations of representative and varying player tokens utilized by the various players of the instant invention.

DESCRIPTION OF THE PREFERRED EMBODIMENT

Figure 11:
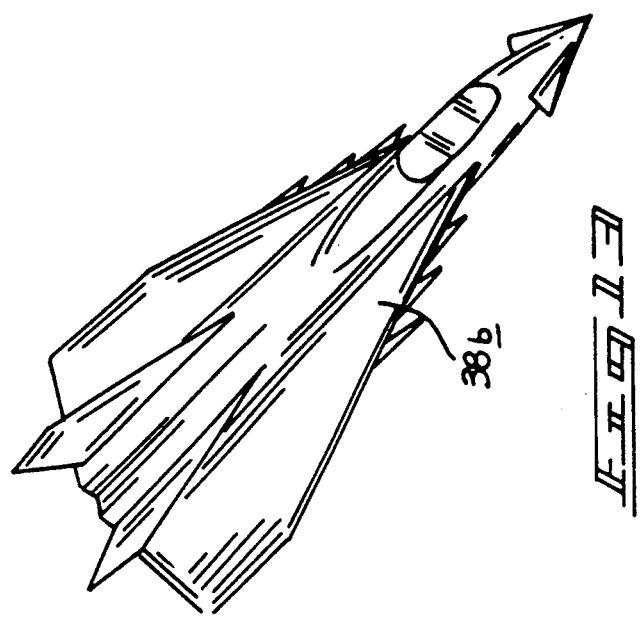

With reference now to the drawings, and in particular to FIGS. 1 to 14 thereof, a new and improved space travel game embodying the principles and concepts of the present invention and generally designated by the reference numerals 11 through 38 will be described.

Figure 12:
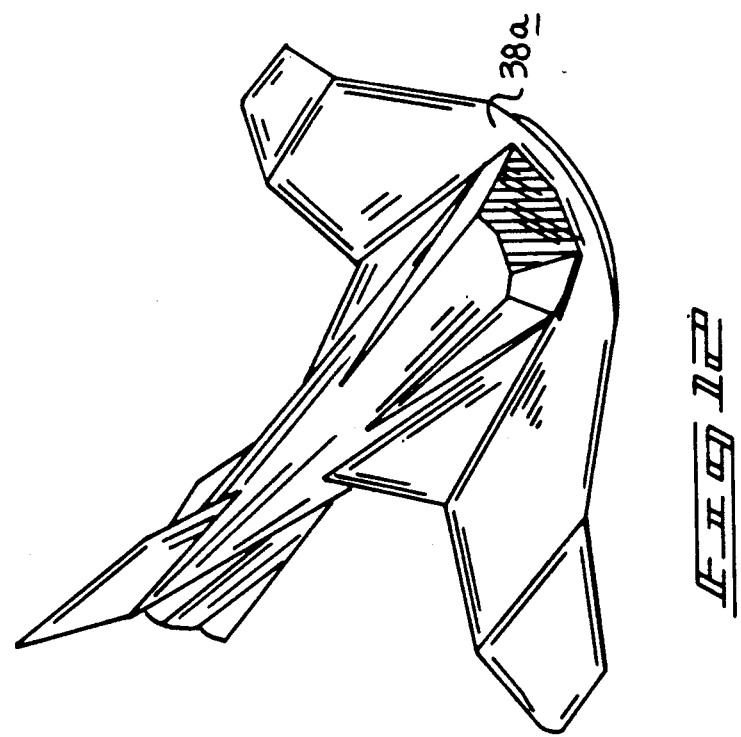

More specifically, the space travel game of the instant invention essentially comprises a game board 11, including a central coaxially oriented sun space 12, with a predetermined number of concentric travel rings, with each travel ring divided into a predetermined number of spaces, with each space including a peg receiving bore 24 positioned medially thereof. The travel rings include a first travel ring 13 representative of an orbit Mercury about the sun space 12. A second travel ring 14 representative of an orbit of Venus about the sun space 12. A third travel ring 15 representative of an earth orbit about the sun space 12. A fourth travel ring 16 representative of the planet Mars and its orbital travel about the sun space 12. A fifth travel ring 17 representative of a first asteroid belt directed about the sun space 12 and a circular orbit. A sixth travel ring 18 representative of the planet Jupiter and its circular travel about the sun space 12. A seventh travel ring 19 representative of the planet Saturn and its orbit about the sun space 12. An eighth travel ring 20 representative of the planet Uranus and its circular orbit about the sun space 12. A ninth travel ring 21 and its representative planet Neptune in a circular orbit about the sun space 12. A tenth travel ring 22 and its representative planet Pluto and its circular orbit about the sun space 12, and an eleventh travel ring 23 representative of a second asteroid belt and a circular orbit about the sun space 12 defining eleven travel rings, as noted. Each player includes a respective planet storage area defined by a first planet storage area 25, a second planet storage 25a, a third planet storage 25b, and a fourth planet storage area 25c. Each planet storage area includes nine planet storage spaces 26 with a respective bore for receiving a peg of a flag token 37, as indicated in FIG. 6. Accordingly, each player is provided nine flag tokens for a total of 36 flag tokens, whereupon a player conquering a planet by landing in a space within one of the travel rings occupied by a respective planet, that player may thereafter insert an associated flag within one of the planet storage spaces 26, with a respective storage space 26 afforded each player. Each player throughout a starting space is defined by a first starting space 27, a second starting space 27a, a third starting space 27b, and a fourth starting space 27c for each respective player of the four players in play of the game. The starting spaces are arranged concentrically about the sun space 12 to afford equal access to the various travel rings by each player. Further, each player is provided a launch pad defined by a first launch pad 29, a second launch pad 29a, a third launch pad 29b, and a fourth launch pad 29c, with a single launch pad afforded each respective player. In initiating play, each player initially positions their respective token 38 and its peg within each launch pad and its associated bore for positioning of each player token 38. FIGS. 12-14 are illustrative of various player tokens that may be utilized to afford each player a contrasting space-type vessel representation in play of the game. Further, each player is provided a missile indicator space, with a first missile indicator space 31 provided the first player, a second missile indicator space 31a provided for the second player, a third missile indicator space 31b provided for the third player, and a fourth missile indicator space 31c for the fourth player. Each player has been afforded missiles to permit attack upon opposing players, with their use to be described in more detail below. A die cup 32 is provided for each player and accordingly four die cups are utilized, with a single die cup 32 represented in FIG. 4 for purposes of illustration, with each player utilizing a respective die member 33, as illustrated in FIG. 10 Further, nine planet tokens 34 are provided, with a differing planet token provided for each of the nine planets of the solar system defined by a differing planet token for Mercury, Venus, Earth, Mars, Jupiter, Saturn, Uranus, Neptune, and Pluto. Further, four asteroids tokens 35 are provided, with two asteroid tokens utilized in a first asteroid belt of the fifth travel ring 17 and two asteroid tokens utilized in the second asteroid belt defined by the eleventh travel ring 23. Asteroids may be utilized to destroy other player's ships or protect themselves from attack from opposing players by hiding behind an asteroid that is not penetrated by opposing missiles or player tokens, to be described in more detail below. Accordingly, four missile tokens 36 are provided with one missile token 36 positioned within a respective indicator space 31 through 31c for each respective player when a missile is being utilized by that respective player.

RULES OF THE GAME

Determination of Player Sequence in Play

Each player will effect a respective role of a respective die member 33, the highest point scored will go first and in sequence, the remaining players with the next highest point total will follow. The players will be positioned in a respective clockwise orientation in descending order of a point total awarded each player to ensure sequential play about the board. If a plurality of players are tied, those players will roll the die 33 again.

PLAYERS TURN

A player may roll the die 33 and have three choices of movements throughout the predetermined number of spaces through the plurality of travel rings 13-23. They may at their discretion effect movement of their player token 38, a planet or asteroid token 34 and 35 respectively. Each player must have their ship in the solar system, or within one of the travel rings 13-23 before they may effect movement of a planet or asteroid token 34 or 35 through a respective travel ring 13-23.

EACH RESPECTIVE PLAYER TOKEN

Movement of each player token or space ship token 38 is available in only two directions of travel. The player token may move radially inwardly towards the central sun space 12 or orbitally about each respective travel ring. Diagonal moves are not permitted, but a combination of radial and orbital moves are available. The player will move a single space in association with the number indicated upon the player's respective point total awarded by a roll of the die member 33.

PERMISSIBLE MOVEMENT OF EACH PLAYER TOKEN

Each player token 38 may land in a space occupied by a planet if not occupied by an opposing player token. Further, each player token 38 may land on a planet token 34 more than once. A player token may move back in their own respective entry space 30-30c respectively, or their respective launch pad 29-29c anytime during travel of the game board. Further, each player token may travel through that section of the game board not occupied by another player token and may travel over an unoccupied planet token within an associated space. The tokens may travel both in clockwise and counter-clockwise directions about the game board in each respective travel ring 13-23.

PROHIBITION OF PLAYER TOKEN MOVEMENT

A player token may not land upon or travel over a space occupied by an asteroid token 34. A player token may further not enter another player's space 30-30c or launch pad space 29-29c, or may not travel into a space occupied by another player token, including those player tokens occupying a planet.

MOVEMENT OF EACH RESPECTIVE PLANET TOKEN

Each planet token 34 may be moved instead of a respective player's token in accordance with the number generated by the rolling of the die member 33. A strategy to benefit a player and jeopardize a opposing players in plurality of play. In the movement of a planet token between two opposing player tokens 38, blockage of attack from an opposing player may become available. Further by moving a planet token, the planet token will make it difficult for an opponent to land upon that planet, conquer it, and thereby deny that opposing player an ability to plant a flag token 37 within one of the planet storage space bores 26. All of the planet tokens move in a counter-clockwise direction about the central sun space 12 maintaining travel in their own respective travel rings 13-23. A planet token may not be moved to or through another player's ship. Further, a planet token may not be moved into or through an asteroid and finally, a planet token may not be moved if it is occupied by a player token 38.

MOVEMENT OF THE ASTERIOD TOKENS

Asteroid tokens may be utilized in the strategy of the play of the game, wherein players may utilize them to destroy opposing players ships and shield a moving player's token from attack by an opposing player's ship by hiding behind such an asteroid token 35 of the four asteroid tokens. The asteroid tokens are moved in a counter-clockwise direction around the board in their own respective travel ring 17 and 23 defining the fifth and eleventh travel ring. Asteroids may not be destroyed and may be moved into or through one, two, or even three opposing player tokens sending them all back to their respective launch pad bores 29 within a respective player's starting space area 27. A player may not destroy their own player token 38 with an asteroid token 35, and finally, an asteroid token 35 may not be moved into a planet space of an opposing travel ring.

DIRECTING AN OPPOSING PLAYER BACK TO A RESPECTIVE LAUNCH PAD BORE

Two manners are available wherein a player may direct an opposing player's token 38 back into a respective launch pad space 29-29c. One is if it is hit by an asteroid token 35, wherein an asteroid token and opposing player's token are occupying a same space within one of the travel rings 17 and 23. A second involves one of a plurality of players losing an attack from the other. If a player's token is sent back to a launch pad space, it may re-enter upon a next sequential turn of that player.

CONQUERING THE PLANETS

To conquer a planet and permit the positioning of a flag token 37 of nine flag tokens awarded each player within a respective planet storage space and bore space 26, that player token must move an exact amount of spaces as indicated on the die 33 to land on the planet. Once that token has landed on the planet, a flag will be positioned within a respective planet storage space 26 of the nine planet storage spaces afforded each player. If desired, each of the flags may be of contrasting coloration, with a remaining flag being white to be placed in a last planet conquered. The planets may be conquered in any order available.

ATTACKING AN OPPOSING PLAYER AND TOKEN

Each player has ten missile strikes available to attack an opposing player. It is a device to fire only when necessary to avoid wasting such missile attacks. Once a missile has been fired, it must be indicated on each respective player missile indicator space 31-31c by positioning of a respective missile indicator token 36 and its peg within a bore provided within each missile indicator space. A player may make an attack on opponent only before or after that player has made a movement of that player's token 38. If an opposing player's token is in that respective player's entry space 30-30c, it may not be attacked or initiate an attack. A player may not fire a missile at another opponent if another player's ship, planet or asteroid is positioned between them. A missile may only be fired in one of two directions, i.e. radially towards or away from the central sun space 12 or within an adjacent travel ring. Once a player has declared an attack, the opponent will verbally respond by stating the term "return fire" or "shield". When a player's token has been struck, it must be taken out of the solar system or out of the travel rings 13-23 and positioned on the launch pad of each respective player 29-29c. That player will re-enter the solar system again when on that player's next turn. If the opposing player responds "return fire", the attacking player has one roll of the die 33 to get the amount required for the missile to reach the opponent. An excessive number is also permissible. If the attacker's roll is short, it is declared a miss and the opponent now has the opportunity to fire back in a similar manner. If the opponent responds "shield", the attacking player gets to roll the die 33 as many times as necessary to make the exact amount of spaces to make the hit. For example, the attacker needs a five to make a hit to traverse five spaces to reach an opposing player token 38, the roll comes up short and shows three. The attacker may then roll the die 33 again to attain the desired and required number on the die. As long as an attacking player does not roll the die in excess of the required number, the attacking player may proceed to roll the die until the required number is attained. In the attack, the opponent may not return fire after the attacker has missed.

FINAL FLIGHT

After a player has successfully flagged all nine planets by positioning a flag token 37 and its peg within a respective storage space 26 and bore, the player must taken final flight back to the player's respective station or starting space 27-27c of each respective player. If a player is hit by an asteroid or loses an attack while traveling back, the player's last flagged planet gets taken away. The player attempting the final flight is sent back to that player's respective launch pad 29-29c and again the players will go out and attempt to flag that last planet on a subsequent turn.

A WINNER DECLARED

A player that flags all nine planets successfully and returns back to a player's respective launch pad 29-29c successfully is declared a winner. It should be noted that to land on the player's launch pad space 29-29c, the player token must move the exact amount of spaces indicated on the die to end exactly on the respective launch pad space 29-29c of that player's respective space.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A space travel game wherein a winner is determined by a player of a plurality of players directing visitation of each planet of a predetermined number of planets of a solar system, wherein the game comprises, a game board having a central coaxially oriented sun space, and a plurality of concentric rings positioned about the sun space, and each of the plurality of rings including a planet token means for traversing each concentric ring of the plurality of rings, and each planet token means representative of a respective planet of the predetermined number of planets, and a plurality of player spaces positioned on the game board peripherally about the predetermined number of rings, and each ring divided into an equal number of spaces, and each player including a die member to selectively direct each planet token means about each respective ring, and each of the players including a respective player token means for traversing the rings radially relative to the sun space and concentrically relative to each ring of the plurality of rings within each ring of the plurality of rings for effecting contact with the respective planet token means of the plurality of planet token means, and each player token means arranged for initiating play from a respective player space, and wherein each player space includes a respective planet storage area, and each planet storage area includes a predetermined number of planet storage bores, corresponding to said predetermined number of planets, and each of the planet storage bores arranged for receiving an indicator member, and each player including a predetermined number of indicator members for positioning an indicator member within a respective planet storage bore upon contact by a player token means with a planet token means within a ring of the plurality of rings, and wherein each indicator member includes a flag member mounted to a peg, and each peg receivable within a respective bore of each planet storage bore, and wherein each player space further includes a launch pad bore for initially positioning a player token means prior to the player token means effecting traverse of the plurality of rings, and wherein each player space further includes a missile indicator space, wherein each missile indicator space includes a respective missile indicator bore, and each player is provided a missile indicator token, with each missile indicator token including a missile indicator peg receivable within each missile indicator space to permit attack by one player token relative to a selective competing player token.

2. An apparatus as set forth in claim 1 wherein the plurality of rings include a further plurality of rings, wherein the further plurality of rings each include an asteroid token means, wherein each asteroid token means is concentrically directed about the sun space, and each asteroid token means arranged for movement selectively by each player to effect a hazard to a competing player or to permit utilization of an asteroid token means for a shield against a competing player token means.

* * * * *